June 15, 1965    R. L. DEGA    3,188,855
SEAL LIP FORCE GAUGE AND METHOD
Filed Aug. 25, 1961
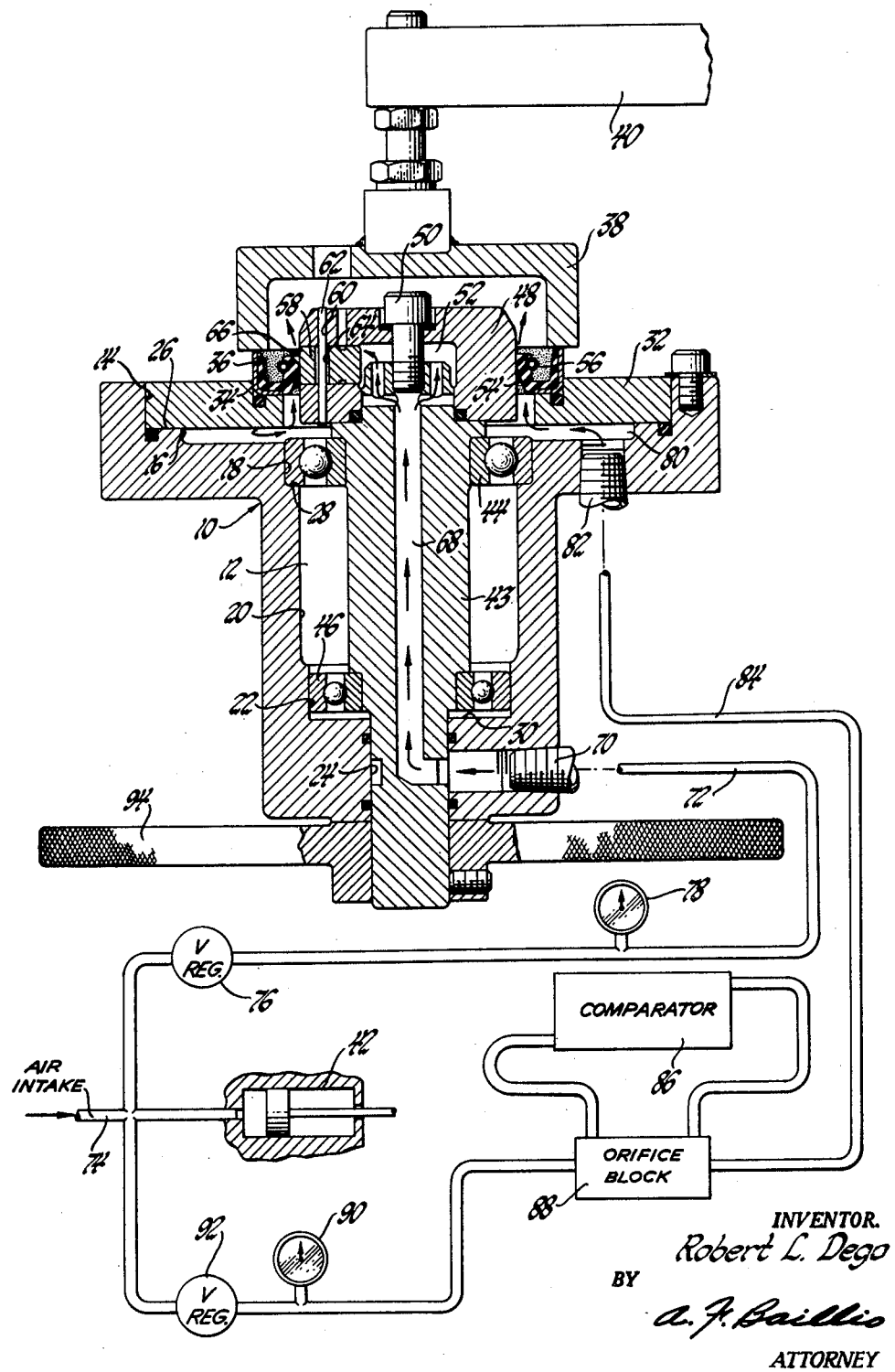
INVENTOR.
Robert L. Dega
BY
A. F. Baillio
ATTORNEY

United States Patent Office 3,188,855
Patented June 15, 1965

3,188,855
SEAL LIP FORCE GAUGE AND METHOD
Robert L. Dega, Utica, Mich., assignor to General Motors Corporation, Detroit, Mich., a corporation of Delaware
Filed Aug. 25, 1961, Ser. No. 134,013
6 Claims. (Cl. 73—37)

This invention relates to apparatus for measuring and comparing flexible lip-type seals and more particularly to a method and apparatus for determining radial pressures in the flexible lip of a flexible lip-type seal.

Radially inwardly directed forces which are exerted by a seal lip against a shaft with which it is sealingly associated are dependent upon various factors. Some of the factors which affect the radial force exerted by the seal lip are concentricity, material hardness variations, cross sectional variations due to molding, eccentricity due to trimming, and force exertion by the mechanical springing devices which are conventionally associated with the seal lip. Flexible lip-type seals and factors determining sealing quality are discussed more fully in my co-pending applications, S.N. 772,858 and S.N. 25,963, now Patent Nos. 3,097,521, and 3,132,507, respectively. The present method and apparatus is adapted to be used in conjunction with the apparatus described in the aforementioned co-pending applications and reference will be made thereto hereinafter.

An object of this invention is to provide means to measure radially inwardly directed forces in a seal lip. A further object of this invention is to provide a method and apparatus for measuring radially inwardly directed forces of a seal lip at discrete points around the periphery thereof. Still a further object is to provide a method and apparatus for measuring and comparing incremental seal lip force variations around the periphery of a lip-type seal. Other objects and advantages of the present invention will be apparent to those skilled in the art by reference to the following detailed description and the accompanying drawing wherein a side elevational view, partly in section, of an illustrative embodiment of the present invention is shown.

The method and apparatus of the present invention are similar to the aforementioned co-pending applications; in that, a test shaft with which a test seal is to be associated is coaxially mounted relative to a circumjacent seal seat and a test seal is mounted on the seal seat in peripheral sealing engagement with the test shaft. In the present invention, the test shaft is provided with radially outwardly expandable means adapted to engage the seal lip and to exert a radially outwardly directed force thereagainst. Outward movement of the seal lip allows high pressure air to flow between the seal lip and the shaft from a sealed chamber formed behind the seal. By measurement at the rate of flow of air past the seal lip and the amount of radial force exerted thereon, seal lip pressures can be determined and variations in seal lip pressure around the periphery of the seal lip will be shown.

Referring now to the drawing, a testing housing 10, similar to that disclosed in Serial No. 772,858, is provided with a central cavity 12 defined by a series of counterbores 14, 16, 18, 20, 22, 24. The counterbores define transverse seat surfaces 26, 28, 30 for purposes to be hereinafter described. A seal seat plate 32 is fixedly secured on the seat 26 and provides an annular seal seat 34 adapted to receive the outer casing of a conventional lip-type seal 36. A clamping plate 38 is connected to a pivotally mounted lever 40 for actuation by a power cylinder 42 as described in the aforementioned co-pending application.

A spindle 43 is rotatably mounted in the cavity 12 on bearing members 44, 46. A test shaft 48 is secured to the upper end of the spindle 43 by a suitable fastening device 50 and defines an air chamber 52 therewith. The outer diameter of the shaft 48 is equal to the diameter of a shaft with which the flexible lip-type seal 36 is adapted to be used so that the seal lip 54 is normally in peripheral wiping engagement with the shaft. For purposes of illustration, a mechanical spring element 56, such as a garter spring, is mounted on the flexible lip 54 to provide a radially inwardly directed force. A plug 58 is slidably mounted in a transversely extending bore 60 of the shaft 48. Radial outward displacement of the plug 58 is limited by a locating pin 62 which is fastened in the test shaft 48 and extends through a bore 64 provided in the plug 58. The outer surface 66 of the plug 58 is arcuate and contoured to exactly match the contour of the periphery of the shaft 48. An air passage 68 extends longitudinally within the spindle 43 to connect the air chamber 52 with an air inlet 70. A conduit 72 connects the air inlet 70 to a pressure source 74 through a pressure regulator 76 and conventional gauge means 78.

The seal seat plate 32, test shaft 48, spindle 43 and the housing 10 define an air chamber 80 which is connected through an inlet 82 to a conduit 84. A conventional comparator 86, orifice block 88, pressure gauge 90 and regulator valve 92 are associated with the conduit 84 as described in aforementioned co-pending applications. Conduit 84 is also connected to a pressure source. Air is supplied to the chamber 80 at a relatively low pressure so that the seal lip is not deformed thereby.

In operation, a test seal 36 is mounted on the seal seat 34 with the seal lip 54 in peripheral engagement with the test shaft 48. The cylinder 42 is actuated to move the clamp 38 into clamping engagement with the flexible lip-type seal as shown. A conventional O ring or the like is provided on the seal seat 34 to insure that air in the chamber 80 can only escape between the seal lip and the test shaft. Similar conventional O ring seals are provided between the test shaft 48 and the spindle 43, and between the seal plate 32 and the housing 10 as illustrated. In order to test radially inwardly directed forces of the seal lip, high pressure is admitted to the chamber 52 by actuation of the regulator valve 76 which permits high pressure air to flow through the conduit 72 and the passage 68 to the air chamber. Since the air chamber 52 is sealed, pressure builds up therein and exerts a radially outwardly directed force on the plug 58 to cause radial outward movement thereof. The outer surface 66 of the plug 58 is moved radially outwardly against the adjacent surface of the seal lip to cause radial outward displacement thereof. As the seal lip is radially outwardly displaced, openings are formed on either side of the plug 58 between the seal lip and the test shaft 48. The air in the chamber 80 flows outwardly between the seal lip and the test shaft through the openings formed by radial outward movement of the plug 58. As is described in detail in the aforementioned co-pending applications, the rate of flow of air from the chamber 80 past the seal lip 54 is measured by the comparator 86. The pressure exerted against the plug 58 in the chamber 52 is indicated by the pressure reading of gauge 78 and is an indication of radially inwardly directed seal lip forces tending to restrain outward movement of the plug 58. In order to measure seal lip forces around the entire periphery of the seal lip, the spindle 43 and test shaft 48 are rotatably mounted on the bearings 44, 46 and are rotatable by means of a hand wheel 94 secured to the lower end of the spindle. The amount of pressure needed in the chamber 52 at each test location around the seal lip periphery to obtain a predetermined rate of flow from the chamber 80 will be a direct indication of the radially inwardly directed forces of the seal lip. Accordingly, minimum and maximum flow rates at particular pressures can be determined for selecting seals having seal lip forces within preselected limits.

Obvious modifications in the details of construction and the arrangement of the parts are intended to be included within the scope of the invention as defined by the appended claims, except insofar as limited by the prior art.

I claim:

1. The method of measuring radial forces in a flexible lip-type seal comprising the steps of: (1) placing a flexible lip-type seal to be tested in sealing association with a test shaft, (2) forming an air chamber behind said seal from which air can flow only between the lip of said seal and said test shaft, (3) radially outwardly depressing the seal lip of said flexible lip-type seal, (4) measuring the rate of air flow past the seal lip during radial outward displacement thereof relative to said shaft, and (5) measuring the pressure required to radially outwardly displace the seal lip to obtain an indication of seal quality.

2. The method of measuring radially inwardly directed forces of a flexible lip-type seal comprising the steps of: (1) placing a flexible lip-type seal to be tested in sealing relationship with a rotatable test shaft, (2) flexing a localized region of the seal lip so that it disengages the test shaft surface, (3) passing a fluid at a measurable flow rate between the seal lip and test shaft where they are in disengagement, and (4) measuring the force required to flex said localized region of the lip, the amount of disengagement being indicated by the rate of fluid flow between the seal lip and shaft.

3. Apparatus for measuring lip force in a flexible lip type seal comprising, a base, a test shaft mounted on said base, means mounted on said base to support a flexible lip type seal with the flexible lip in peripheral sealing engagement with said test shaft, radially displaceable means slidably mounted on said test shaft and forming a portion of the peripheral surface thereof in engagement with the seal lip, means actuating said radially displaceable means to produce a localized flexure of said lip and disengage a portion thereof from said test shaft, means adapted to direct a flow of pressure fluid at a measurable flow rate between the lip and the shaft at the region of disengagement, means measuring the force required to cause radial outward displacement of the seal lip, and means measuring the flow rate of said pressure fluid.

4. The apparatus as defined in claim 3 and wherein said means radially displacing said radially displaceable means comprises an air chamber formed centrally of said test shaft, means to convey high pressure air to said chamber, means to regulate and measure the air pressure in said chamber, and said chamber being closed to prevent flow of air therefrom so that pressure increases in said chamber cause corresponding radial outward displacement of said radially outwardly displaceable means.

5. The apparatus as defined in claim 3 and wherein said radially displaceable means comprises a plug slidably received and supported by said test shaft, and said plug having an arcuate outer surface contoured to match and form an extension of the adjacent peripheral surface of said test shaft prior to radial outward displacement thereof.

6. Apparatus for testing local lip forces of a flexible lip type seal comprising, a rotatable test shaft having fluid pressure passage means formed therein communicating with an exterior surface of the shaft, a radially movable shaft segment forming a portion of the test shaft surface and being exposed to the passage means, stationary seal retaining means surrounding the test shaft and adapted to removably mount a lip type seal with a lip portion circumjacent the shaft in a plane that includes the movable shaft segment, the lip portion of the seal being in sealing relationship with the test shaft and defining a fluid tight chamber between the seal and the seal retaining means, a source of fluid under pressure connected with the passage means in the shaft whereby local radially compressive forces can be exerted by the shaft on the seal lip, a source of pressure fluid connected with said chamber, means measuring the pressure exerted on said movable shaft segment, and means measuring the flow of fluid from said chamber so that the radial forces can be determined through the periphery of the seal by rotating the shaft segment.

References Cited by the Examiner

UNITED STATES PATENTS 2,448,735   9/48   Pigott et al. _____ 73—120

ISAAC LISANN, *Primary Examiner.*